(12) United States Patent
Cooper

(10) Patent No.: US 9,644,726 B2
(45) Date of Patent: May 9, 2017

(54) VEHICLE DIFFERENTIAL AND METHOD OF OPERATING THE SAME

(71) Applicant: Dana Heavy Vehicle Systems Group, LLC, Maumee, OH (US)

(72) Inventor: Kenneth E. Cooper, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 256 days.

(21) Appl. No.: 14/537,948

(22) Filed: Nov. 11, 2014

(65) Prior Publication Data

US 2016/0131240 A1    May 12, 2016

(51) Int. Cl.

| | |
|---|---|
| F16H 48/05 | (2012.01) |
| F16H 48/06 | (2006.01) |
| F16H 48/24 | (2006.01) |
| F16H 48/22 | (2006.01) |
| F16H 48/32 | (2012.01) |
| F16H 48/38 | (2012.01) |
| F16H 48/10 | (2012.01) |
| F16H 48/08 | (2006.01) |
| B60K 17/16 | (2006.01) |
| B60K 17/36 | (2006.01) |

(52) U.S. Cl.
CPC .......... *F16H 48/05* (2013.01); *B60K 17/165* (2013.01); *B60K 17/36* (2013.01); *F16H 48/06* (2013.01); *F16H 48/08* (2013.01); *F16H 48/10* (2013.01); *F16H 48/22* (2013.01); *F16H 48/24* (2013.01); *F16H 48/32* (2013.01); *F16H 48/38* (2013.01); *F16H 2048/387* (2013.01)

(58) Field of Classification Search
CPC ...................................................... F16H 48/05
See application file for complete search history.

(56) References Cited

U.S. PATENT DOCUMENTS

| | | |
|---|---|---|
| 3,063,529 A | 11/1962 | Cook |
| 3,161,270 A | 12/1964 | Aschauer |
| 3,680,409 A | 8/1972 | Chamberlain |

(Continued)

FOREIGN PATENT DOCUMENTS

| | | |
|---|---|---|
| DE | 102011010597 A1 | 2/2012 |
| DE | 102012216710 A1 | 3/2014 |

(Continued)

OTHER PUBLICATIONS

International Search Report and Written Opinion for Application No. PCT/US15/059025, mailing date Feb. 19, 2016, issued by the European Patent Office.

*Primary Examiner* — Erin D Bishop
*Assistant Examiner* — Lori Wu
(74) *Attorney, Agent, or Firm* — Marshall & Melhorn, LLC

(57) ABSTRACT

A differential and method of operating the differential is described. The differential has side gears and at least one pinion gear in mesh with the side gears. One of the side gears is provided with dog clutch teeth and an axially extending ring carrying clutch plates. A clutch housing has an axially extending ring carrying clutch plates interleaved with the side gear clutch plates. A dog clutch ring is connected to the clutch housing and selectively engages with the side gear dog clutch teeth. The above-described system permits an axle system of a tandem axle system to be selectively engaged and disengaged.

15 Claims, 3 Drawing Sheets

(56) References Cited

U.S. PATENT DOCUMENTS

| | | | |
|---|---|---|---|
| 4,263,824 A * | 4/1981 | Mueller | B60T 8/171 |
| | | | 475/86 |
| 4,526,063 A * | 7/1985 | Oster | F16H 48/08 |
| | | | 192/48.3 |
| 4,907,685 A | 3/1990 | Landolt | |
| 6,079,535 A | 6/2000 | Mueller et al. | |
| 7,300,385 B2 | 11/2007 | Cherry et al. | |
| 7,497,311 B2 | 3/2009 | Knowles | |
| 8,474,349 B2 | 7/2013 | Grogg et al. | |
| 8,584,786 B2 | 11/2013 | Grogg | |
| 8,584,823 B2 | 11/2013 | Phillips et al. | |
| 8,720,633 B2 | 5/2014 | Grutter et al. | |
| 8,905,212 B2 | 12/2014 | Vierk et al. | |
| 2005/0261101 A1 * | 11/2005 | Yoshioka | B60K 17/16 |
| | | | 475/231 |
| 2010/0038164 A1 | 2/2010 | Downs et al. | |
| 2010/0094519 A1 | 4/2010 | Quehenberger et al. | |
| 2012/0252625 A1 * | 10/2012 | Crasset | F16H 48/22 |
| | | | 475/231 |
| 2013/0260959 A1 | 10/2013 | Quehenberger et al. | |

FOREIGN PATENT DOCUMENTS

| | | | |
|---|---|---|---|
| JP | 2800945 B2 * | 9/1998 | F16H 48/22 |
| WO | 8602981 A1 | 5/1986 | |

* cited by examiner

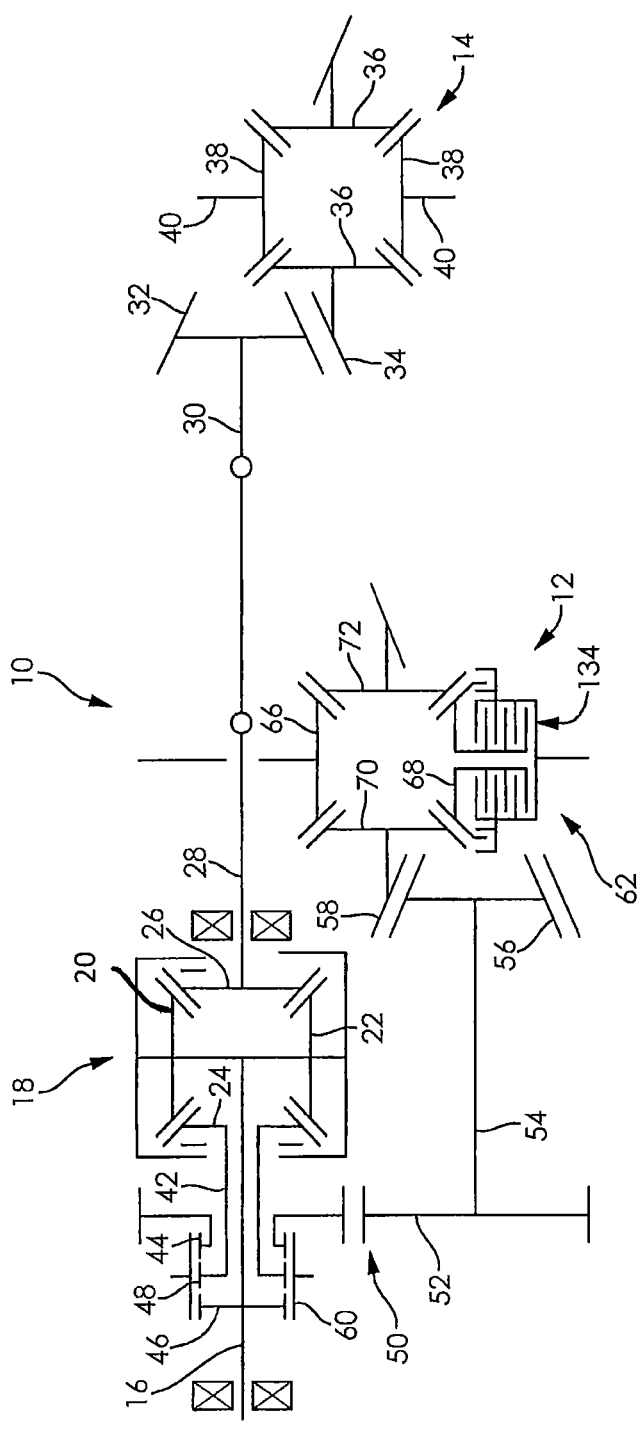
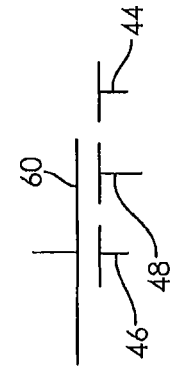
FIG. 1C
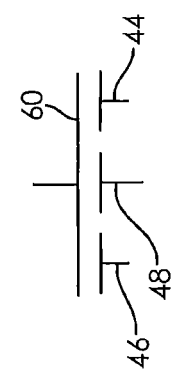
FIG. 1B
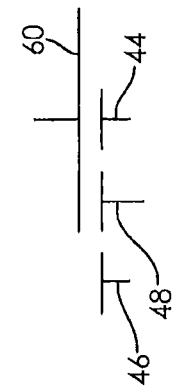
FIG. 1A
FIG. 1

VEHICLE DIFFERENTIAL AND METHOD OF OPERATING THE SAME

FIELD OF THE INVENTION

The present invention relates to a differential for a vehicle and a method of operating the same.

BACKGROUND OF THE INVENTION

A tandem axle vehicle utilizes a forward axle and a rear axle. Typically, at least one of the axles is driven and in some cases both axles are driven.

If both axles are driven, it can be desirable to selectively disconnect one of the axles during times of low tractive requirements. This is preferable since during times of low tractive requirements, the axle that remains engaged can handle the tractive requirements of the vehicle by itself. It can be appreciated that when an axle is disconnected from the driveline, spinning and friction losses decrease, which results in increased driveline efficiency.

Systems to disconnect, and then reconnect, a drive axle are well known. However, many of them suffer from being complex, difficult to manufacture, difficult to repair, expensive to maintain and they cannot be retrofitted to existing vehicles.

In view of the disadvantages of the prior art systems, it would be advantageous to provide a relatively simple, inexpensive, easy to use and easy to manufacture system for selectively engaging and disengaging an axle in a tandem axle system.

SUMMARY OF THE INVENTION

A first side gear, a second side gear and at least a first pinion gear in mesh with the first and the second side gears are located within a differential case. The first side gear is splined to a first axle half shaft. The second side gear has an inboard face with teeth meshed with the pinion gear and an outboard face with dog clutch teeth and an axially extending ring.

A clutch housing is located within the differential case. The clutch housing has an inboard portion and an outboard portion. The outboard portion comprises an outboard ring concentric with a second axle half shaft. The inboard portion comprises a first axially extending ring and a second axially extending ring. The axially extending rings are concentric with one another. The first axially extending ring is splined to the second axle half shaft.

A clutch pack is located within the housing and comprises a plurality of interleaved clutch plates. The plurality of interleaved clutch plates comprises a first set of clutch plates splined to the second side gear axially extending ring and a second set of clutch plates splined to the clutch housing second axially extending ring.

A dog clutch ring is located within the housing. The dog clutch ring is splined to an outer surface of the second axially extending ring. The ring has dog clutch teeth thereon.

A method of operating the differential comprises the step of biasing a friction clutch piston located in the differential into selective engagement with the interleaved clutch plates so that the second set of clutch plates imparts rotation to the first set of clutch plates to bring the first set of clutch plates to a first predetermined rotational value.

The method includes biasing the dog clutch ring into engagement with the side gear with a dog clutch piston so that the side gear and the clutch housing rotate at the same speed. The second clutch housing axially extending ring rotates radially inward of the side gear axially extending ring, which rotates radially inward of the dog clutch ring.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 is a schematic, top view of one embodiment of a tandem axle system;

FIG. 1A is a partial, schematic top view of a shift collar of the tandem axle system of FIG. 1 in a first position;

FIG. 1B is a partial, schematic top view of the shift collar of the tandem axle system of FIG. 1 in a second position;

FIG. 1C is a partial, schematic top view of the shift collar of the tandem axle system of FIG. 1 in a third position;

DETAILED DESCRIPTION OF THE PREFERRED EMBODIMENTS

Figure 2:
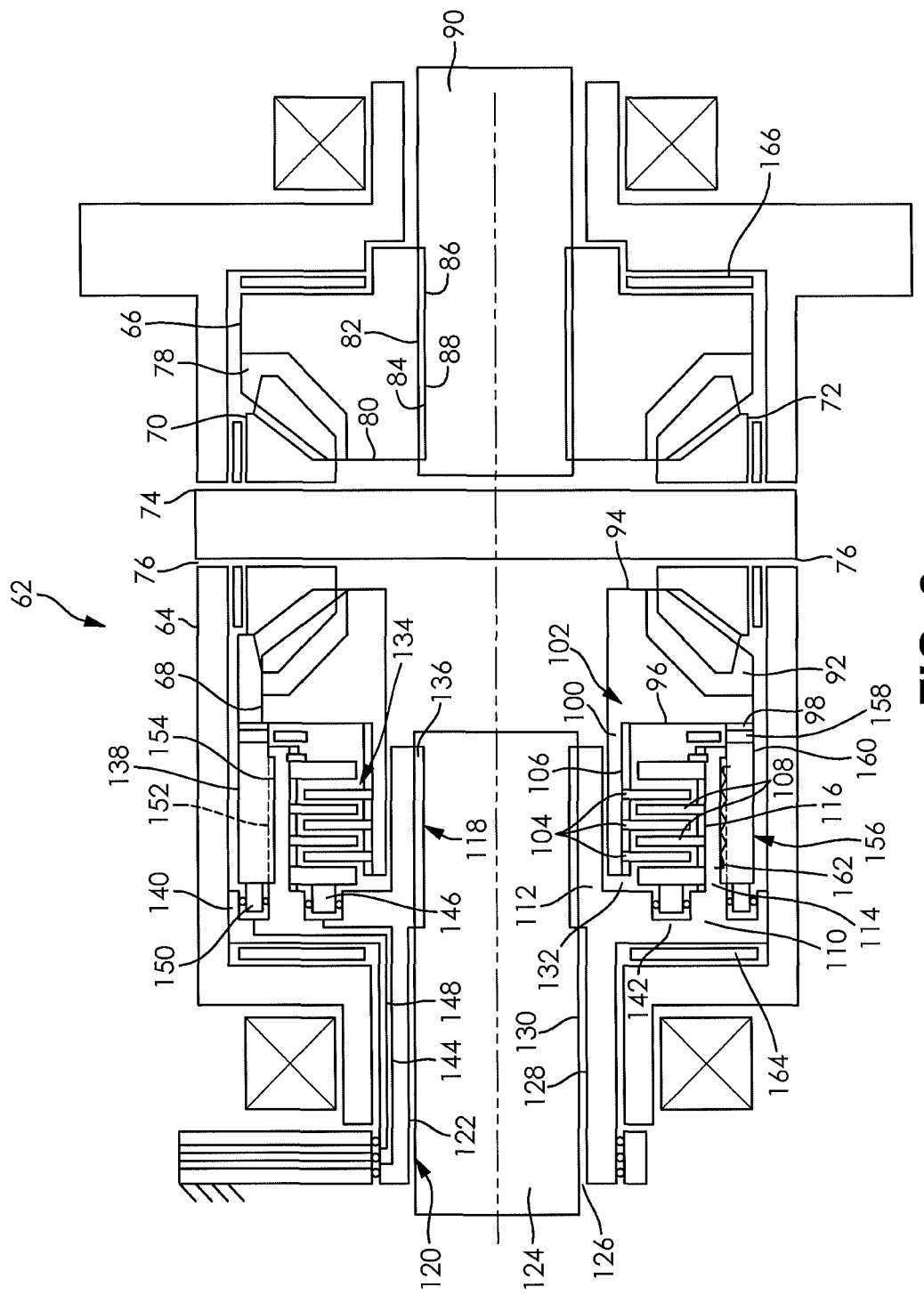
FIG. 2 is a partial, schematic side view of one embodiment of a differential for the tandem axle system.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Turning now to FIG. 1, one embodiment of a tandem axle system 10 is depicted. The tandem axle system 10 comprises a first axle system 12 and a second axle system 14.

An input shaft 16 provides rotation from a source of power, such as an engine/transmission combination (not shown). The input shaft 16 extends to an interaxle differential 18. The input shaft 16 drives first and second pinion gears 20, 22, which are meshed with first and second side gears 24, 26 in the interaxle differential 18.

The second side gear 26 is connected to an interaxle drive shaft 28. The interaxle drive shaft 28 is connected to the second axle system 14. More particularly, the interaxle drive shaft 28 drives a pinion shaft 30 and associated pinion gear 32 of the second axle system 14. The pinion gear 32 is meshed with a differential ring gear 34. The differential ring gear 34 is connected to a differential case (not shown) housing differential pinion gears 36 meshed with differential side gears 38. The differential side gears 38 are connected to axle half shafts 40 that each extend to wheel ends (not shown).

The first side gear 24 in the interaxle differential 18 is connected to a shaft 42 concentric with the input shaft 16. A first gear 44 is mounted on the concentric shaft 42. A second gear 46 is mounted on the input shaft 16 adjacent the first gear 44. A third gear 48, from a drop gear set 50, is mounted adjacent the first gear 44.

The drop gear set 50 comprises the third gear 48 meshed with another gear 52 connected to a pinion shaft 54 and associated pinion gear 56 both of which are part of the first axle system 12. The pinion gear 56 is meshed with a differential ring gear 58. The differential ring gear 58 is connected to a differential case (not shown) housing differential pinion gears meshed with differential side gears. The side gears are connected to axle half shafts which are described in greater detail below.

A shift collar 60 is concentric the first gear 44, the second gear 46 and the third gear 48. As can be appreciated from FIG. 1A-C, the shift collar 60 is movable among the gears 44, 46, 48.

More particularly, in FIG. 1A the shift collar 60 is axially shifted to connect with the first 44 and third 48 gears. It can be appreciated from FIG. 1 that this results in the first and second axle systems 12, 14 being connected if the interaxle differential 18 is open.

In FIG. 1B, the shift collar 60 connects the first 44, second 46 and third 48 gears. It can be appreciated from FIG. 1 that this results in the first and second axle systems 12, 14 being connected if the interaxle differential 18 is locked.

In FIG. 1C, the shift collar 60 connects the second 46 and third 48 gears. It can be appreciated from FIG. 1 that this results in just the second axle system 14 being driven with the interaxle differential 18 locked.

Turning to FIG. 2, a differential 62 for the first axle system 12 is depicted. More particularly, a differential case 64 is depicted. The case 64 houses a first side gear 66, a second side gear 68 and at least a first pinion gear 70 in mesh with the first and the second side gears 66, 68. Preferably, a second pinion gear 72 is meshed with both side gears 66, 68. The pinion gears 70, 72 are mounted on a spider shaft 74 that extends through the pinion gears 70, 72 into apertures 76 in the differential case 64.

The first side gear 66 has teeth 78 on an inboard surface 80 meshed with the first and second pinion gears 70, 72. The first side gear 66 also has an inner surface 82 with splines 84. The splines 84 are engaged with splines 86 on an outer, inboard surface 88 of a first axle half shaft 90 located within the first side gear 66.

The second side gear 68 has teeth 92 on an inboard face 94 meshed with the first and second pinion gears 70, 72. The second side gear 68 also has an outboard face 96 with dog clutch teeth 98 and an axially extending ring 100. The dog clutch teeth 98 are located radially out from the axially extending ring 100. The dog clutch teeth 98 and axially extending ring 100 are unitary, one-piece and integrally formed with the second side gear 68.

The axially extending ring 100 extends from a lowermost, outboard corner portion 102 of the second side gear 68 in an outboard direction from the second side gear 68.

A first set of clutch plates 104 are splined for axial movement along an inner surface 106 of the axially extending ring 100. The first set of clutch plates 104 are interleaved with a second set of clutch plates 108 splined for axial movement along an inner surface of a clutch housing 110. The clutch housing 110 has a first axially extending ring 112 and a second axially extending ring 114. The second set of clutch plates 108 are mounted for axial movement along an inner surface 116 of the second axially extending ring 114. More particularly, the second of clutch plates 108 are splined for axial movement along the inner surface 116 of the second axially extending ring 114.

The clutch housing 110 is located within the differential case 64. The clutch housing 110 has an inboard portion 118 and an outboard portion 120. The two portions 118, 120 may be integrally formed, one-piece and unitary.

The outboard portion 120 comprises an outboard ring 122 concentric with a second axle half shaft 124. A gap 126 is located between an inner surface 128 of the outboard ring 122 and an outer surface 130 of the second axle half shaft 124.

The inboard portion 118 of the clutch housing 110 comprises the first axially extending ring 112 and the second axially extending ring 114. The axially extending rings 112, 114 are concentric with one another but a cavity 132 is between them for a clutch pack 134 comprising the first set of clutch plates 104 and the second set of clutch plates 108.

An inner surface 136 of the first axially extending ring 112 is splined to the outer surface 130 of the second axle half shaft 124 for rotation therewith.

The clutch housing first axially extending ring 112 is concentric with and radially inboard the second side gear axially extending ring 100. The second side gear axially extending ring 100 is concentric with and radially inboard the clutch housing second axially extending ring 114. The clutch housing second axially extending ring 114 is concentric with and radially inboard a dog clutch ring 138.

The first axially extending ring 112, the second axially extending ring 114 and a third axially extending ring 140 are connected to a base plate 142. The base plate 142 is connected to the outboard ring 122.

At least one fluid line extends through the outboard ring 122 and the base plate 142 of the clutch housing 110. Preferably, a first fluid line 144 extends through the outboard ring 122, through the base plate 142 to a friction clutch piston 146. A second fluid line 148 extends through the outboard ring 122, through the base plate 142 to a dog clutch ring piston 150.

The dog clutch ring 138 is also located within the differential case 64. An inner surface 152 of the dog clutch ring 138 is splined to an outer surface 154 of the second axially extending ring 114 of the clutch housing 110 for relative axial movement therewith.

An inboard end 156 of the dog clutch ring 138 has a set of dog clutch teeth 158 thereon. An outboard end 160 of the dog clutch ring 138 is connected to the dog clutch piston 150. The dog clutch piston 150 may be at least partially housed between the second axially extending ring 114 of the clutch housing 110 and the third axially extending ring 140 of the clutch housing 110.

A biasing structure 162 is also located within the differential case 64. The biasing structure 162 may be such as a spring or the like. The biasing structure 162 is located between the dog clutch ring 138 and the clutch housing 110 to selectively bias the dog clutch ring 138 out of engagement with the side gear 68.

At least one thrust washer is also located within the differential case 64. More particularly, a first thrust washer 164 is located between the base plate 142 and the differential case 64 and a second thrust washer 166 is located between the first side gear 66 and the differential case 64. It has been found that the thrust washers 164, 166 translate the thrust force from the first and second side gears 66, 68 to the differential case 64.

Figure 3:
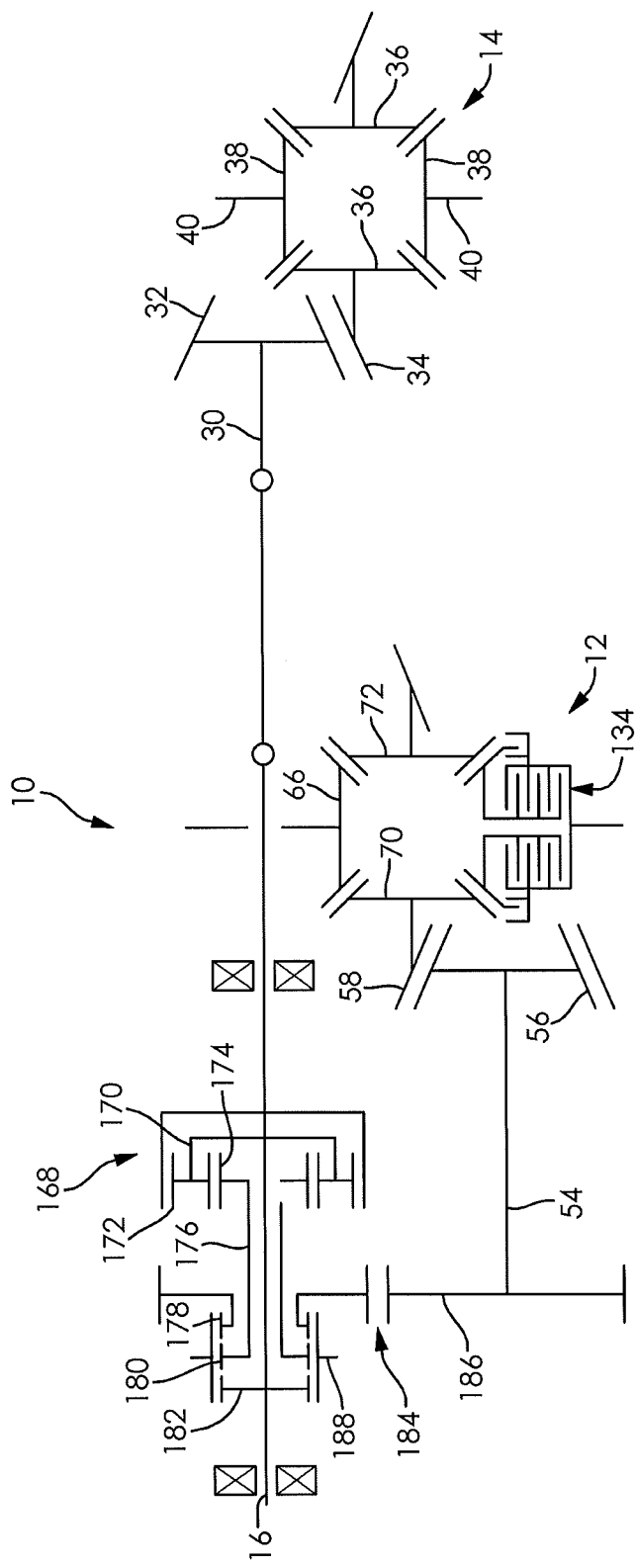
FIG. 3 is a schematic, top view of another embodiment of a tandem axle system.

FIG. 3 depicts an alternative to the interaxle differential depicted in FIG. 1, however, shared features are provided with identical reference numbers. Further, the description of the shared figures can be appreciated from the above-description of FIG. 1.

The input shaft 16 drives a planetary differential 168. More particularly, the input shaft 16 is connected to a planet carrier 170. Planetary gears 172 are located in the planet carrier 170 and rotate therewith. The planetary gears 172 are meshed with a sun gear 174. The sun gear 174 is connected to a shaft 176 concentric with the input shaft 16. A first gear 178 is located on the concentric shaft 176, opposite the sun gear 174. A second gear 180 is located on the input shaft 16 adjacent the first gear 178. A third gear 182, from a drop gear set 184, is mounted adjacent the first gear 178.

The drop gear set 184 comprises the third gear 182 meshed with another gear 186 connected to the pinion shaft 54 and associated pinion gear 56, as described above.

A shift collar 188 is concentric the first gear 178, the second gear 180 and the third gear 182. As can be appreciated from FIGS. 3A-B, the shift collar 188 is movable among the gears 178, 180, 182.

Figure 3B:
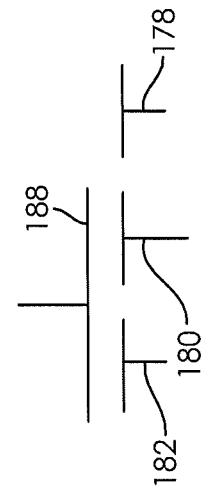
FIG. 3B is a partial, schematic top view of a shift collar of the tandem axle system of FIG. 3 in a second position.
Figure 3A:
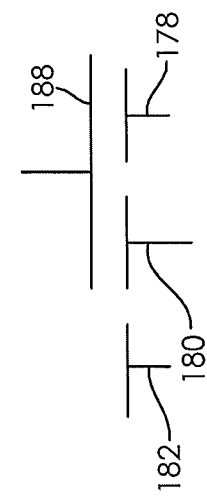
FIG. 3A is a partial, schematic top view of a shift collar of the tandem axle system of FIG. 3 in a first position.

More particularly, in FIG. 3A the shift collar 188 is axially shifted to connect with the first 178 and second 180 gears. It can be appreciated from FIG. 3 that this results in both axles systems 12, 14 being connected if the interaxle differential 168 is open. A high numerical reduction ratio can be employed in this situation.

In FIG. 3B, the shift collar 188 connects the first and second and third gears 180, 182. It can be appreciated from FIG. 3 that this results in just the second axle system 14 being driven. A low numerical reduction ratio can be employed in this situation.

A method of operating the differential 62 includes providing the differential 62 in a mode disconnected from the input shaft 16. In this mode, the differential 62 is not receiving rotation from the input shaft 16; instead, the first and second axle half shafts 90, 124 are rotating as a result of the wheels they are attached to rotating over the ground. When it is desired that the differential 62 receive rotation from the input shaft 16, a fluid (such as air or hydraulic fluid) is sent through the first fluid line 144 to the friction clutch piston 146. The fluid causes the piston 146 to become biased toward the interleaved clutch plates 104, 108.

The second set of clutch plates 108 are rotating with the clutch housing 110, which is connected to the rotating second axle half shaft 124. The second set of clutch plates 108 are biased into the first set of clutch plates 104 by the axial motion of the piston 146. The rotation from the second set of clutch plates 108 imparts to the first set of clutch plates 104 and causes them to rotate. There may be some slippage between the first and second clutch plates 104, 108. The slipping clutch plates 104, 108 provides time for the shift collar 60 or 188 to move into position to connect with the third gear 48, 182 as described above and as depicted in FIGS. 1A, 1B, 3A and 3B.

As the second set of clutch plates 108 is biased more into the first set of clutch plates 104, the first set of clutch plates 104 begins to rotate at the same speed as the second set of clutch plates 108. At the same time, the speed of the engine is increased to provide a synchronous speed so the dog clutch ring 138 can be engaged with the second side gear 68.

When the first and second set of clutch plates 104, 108 are rotating at a first predetermined rotational value, a fluid (such as air or hydraulic fluid) is sent through the second fluid line 148 to the dog clutch ring piston 150. The piston 150 is biased toward the dog clutch ring 138 and moves the dog clutch ring 138 in the axial direction.

The dog clutch ring 138 is moved along its splines on the clutch housing 110 where the dog clutch ring teeth 158 engage with the second side gear dog clutch teeth 92. The dog clutch ring 138 rotates the side gear 68 at the same rate.

The first axle system 12 and the second axle system 14 thus become drivingly engaged with the input shaft 16. The axle systems 12, 14 can remain drivingly engaged with the input shaft 16 for as long as desired. When it is preferred the first axle system 12 is disconnected from the input shaft 16, the fluids to the dog clutch piston 150 and the friction clutch piston 146 can be decreased or stopped. The biasing structure 162 located between the clutch housing 110 and the dog clutch ring 138 biases the dog clutch ring 138 out of engagement with the side gear dog clutch teeth 92. The interleaved clutch plates 104, 108 separate from one another so that one set is no longer driving the other set. The first and second axle half shafts 90, 124 are permitted to rotate with their respective wheels without receiving rotation from the input shaft 16.

Based on the foregoing, it can be appreciated that the tandem axle system 10 can be operated in different modes.

In a first mode of operation, which can be appreciated from FIGS. 1 and 1A, the interaxle differential 18 is open and the shift collar 60 is positioned to connect the first and third gears 178, 182. The first gear 178 is driven by the input shaft 16 through the interaxle differential 18 so that rotation is imparted to the third gear 182 thus driving the first axle system 12. The second axle system 14 also receives rotation from the input shaft 16.

In a second mode of operation, which can be appreciated from FIGS. 1 and 1B, the interaxle differential 18 is locked and the shift collar 60 is positioned to connect the first 44, second 46 and third 48 gears. Rotation is thus provided to the first and second axle systems 12, 14.

In a third mode of operation, which can be appreciated from FIGS. 1 and 1C, the interaxle differential 18 is locked and the shift collar 60 is positioned to connect the first and second gears 44, 46. In this mode, rotation is not provided by the input shaft 16 to the first axle system 12; rotation is provided to the second axle system 14 by the input shaft 16.

The tandem axle system 10 in FIG. 3 can also be operated in different modes. In a first mode of operation, which can be appreciated from FIGS. 3 and 3A, the shift collar 188 only connects the first and third gears 178, 182 so that rotation is imparted to the first and second axle systems 12, 14.

In a second mode of operation, which can be appreciated from FIGS. 3 and 3B, the shift collar 188 only connects the first and second gears 178, 180 so that rotation is only provided to one axle system, such as the second axle system 14.

In accordance with the provisions of the patent statutes, the present invention has been described in what is considered to represent its preferred embodiments. However, it should be noted that the invention can be practiced otherwise than as specifically illustrated and described without departing from its spirit or scope.

I claim:

1. A differential, comprising:
   a differential case;
   a first side gear, a second side gear and at least a first pinion gear in mesh with said first and said second side gears located within said differential case, wherein said first side gear is splined to a first axle half shaft, wherein said second side gear has an axially inboard face with teeth meshed with said pinion gear and an axially outboard face with dog clutch teeth and a second side gear axially extending ring, wherein an axially inboard direction is a direction toward a center of the differential, and an axially outboard direction is a direction away from the center of the differential;
   a clutch housing within said differential case having an axially inboard portion and an axially outboard portion, said axially outboard portion comprising an axially outboard ring concentric with a second axle half shaft, wherein said axially inboard portion comprising a first axially extending ring and a second axially extending ring, wherein said first and second axially extending rings are concentric with one another, wherein said first axially extending ring is splined to said second axle half shaft;

a clutch pack within said clutch housing comprising a plurality of interleaved clutch plates comprising a first set of clutch plates splined to said second side gear axially extending ring and a second set of clutch plates splined to said clutch housing second axially extending ring; and a dog clutch ring within said housing, said dog clutch ring splined to an outer surface of said second axially extending ring, said ring having a dog clutch teeth thereon.

2. The differential of claim 1, wherein a dog clutch piston is connected to an axially outboard side of said dog clutch ring to selectively move said dog clutch ring along said splined outer surface of said clutch housing in axially inboard direction into engagement with said side gear dog clutch teeth.

3. The differential of claim 2, wherein a first fluid channel is connected to said dog clutch piston and a second fluid channel is connected to a friction clutch piston.

4. The differential of claim 1, wherein a biasing structure is located between said dog clutch ring and said clutch housing to bias said dog clutch ring out of engagement with said second side gear.

5. The differential of claim 1, wherein said dog clutch ring is located radially outward from, and concentric with, said clutch plates.

6. The differential of claim 1, wherein said clutch housing first axially extending ring is concentric with and radially inboard said second side gear axially extending ring, which is concentric with and radially inboard said clutch housing second axially extending ring, which is concentric with and radially inboard said dog clutch ring.

7. The differential of claim 1, wherein said first axially extending ring and said second axially extending ring are connected to a base plate and said base plate is connected to said axially outboard ring.

8. The differential of claim 7, wherein at least one fluid channel extends through said axially outboard ring, said base plate and at least one of said first or second axially extending rings of said clutch housing.

9. The differential of claim 7, wherein a first thrust washer is located between said base plate and said differential case and a second thrust washer is located between said first side gear and said differential case.

10. A method of operating a differential, comprising:
biasing a friction clutch piston located in a differential into selective engagement with a set of interleaved clutch plates comprising a first set of clutch plates slidingly engaged to a side gear axially extending ring in said differential and a second set of clutch plates slidingly engaged with a clutch housing axially extending ring in said differential so that said second set of clutch plates imparts rotation to said first set of clutch plates to bring said first set of clutch plates to a first predetermined rotational value, wherein a dog clutch ring is radially outward mounted for rotation with a said clutch housing;

biasing said dog clutch ring into engagement with a said side gear with a dog clutch piston so that said side gear and said clutch housing rotate at the same speed, said clutch housing being connected to an axle shaft by another axially extending ring of said clutch housing;

wherein said clutch housing axially extending ring rotates radially inward of said side gear axially extending ring, which rotates radially inward of said dog clutch ring.

11. The method of claim 10, wherein said differential is part of a first axle system, said first axle system being selectively connected to an input shaft and an interaxle differential for rotation therewith.

12. The method of claim 11, further comprising locking said interaxle differential so that rotation from said input shaft does not rotate said first axle system but permitting rotation from said input shaft to rotate a second axle system.

13. The method of claim 11, further comprising locking said interaxle differential so rotation from said input shaft rotates both said first axle system and a second axle system.

14. The method of claim 11, further comprising opening said interaxle differential so rotation from said input shaft rotates both said first axle system and a second axle system.

15. The method of claim 10, wherein said differential is part of a first axle system, said first axle system being selectively connected to an input shaft and a planetary differential for rotation therewith.

* * * * *

UNITED STATES PATENT AND TRADEMARK OFFICE
CERTIFICATE OF CORRECTION

PATENT NO. : 9,644,726 B2
APPLICATION NO. : 14/537948
DATED : May 9, 2017
INVENTOR(S) : Kenneth E. Cooper It is certified that error appears in the above-identified patent and that said Letters Patent is hereby corrected as shown below:

Column 7, Line 22 in Claim 2 insert the word --an-- between "in" and "axially"

Column 8, Line 18 in Claim 10 remove the word "said" that is located between "a" and "clutch"

Column 8, Line 20 in Claim 10 remove the word "said" that is located between "a" and "side"

Signed and Sealed this
Thirty-first Day of July, 2018

Andrei Iancu
*Director of the United States Patent and Trademark Office*